US007242161B2

(12) United States Patent
Okamoto et al.

(10) Patent No.: US 7,242,161 B2
(45) Date of Patent: Jul. 10, 2007

(54) CONTROL DEVICE FOR MOTORIZED POWER STEERING DEVICE

(75) Inventors: Mineki Okamoto, Gunma (JP); Shuji Endo, Gunma (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 10/528,559

(22) PCT Filed: Sep. 11, 2003

(86) PCT No.: PCT/JP03/11632

§ 371 (c)(1),
(2), (4) Date: Mar. 21, 2005

(87) PCT Pub. No.: WO2004/026665

PCT Pub. Date: Apr. 1, 2004

(65) Prior Publication Data

US 2006/0017413 A1 Jan. 26, 2006

(30) Foreign Application Priority Data

Sep. 19, 2002 (JP) ............................ 2002-272830

(51) Int. Cl.
*H02P 7/00* (2006.01)
*B62D 6/10* (2006.01)
*B62D 5/04* (2006.01)

(52) U.S. Cl. ........................ 318/432; 318/432; 701/41; 180/446

(58) Field of Classification Search ..................... None
See application file for complete search history.

(56) References Cited

U.S. PATENT DOCUMENTS 4,754,829 A 7/1988 Shimizu
4,773,497 A 9/1988 Carlson et al.
4,825,972 A 5/1989 Shimizu
4,837,692 A 6/1989 Shimizu
5,182,711 A * 1/1993 Takahashi et al. ............ 701/41
5,473,539 A * 12/1995 Shimizu et al. ............... 701/41
5,590,732 A 1/1997 Surgino et al.
5,602,451 A * 2/1997 Kohge et al. ............... 318/293
5,719,766 A * 2/1998 Bolourchi et al. ............ 701/42
5,732,373 A * 3/1998 Endo .......................... 701/42

(Continued)

FOREIGN PATENT DOCUMENTS

DE 692 13 362 7/1993

(Continued)

*Primary Examiner*—Lincoln Donovan
*Assistant Examiner*—Robert W. Horn
(74) *Attorney, Agent, or Firm*—Sughrue Mion, PLLC

(57) ABSTRACT

The present invention provides an electric power steering apparatus for controlling a motor based on a current command value calculated from a steering assist command value calculated based on a steering torque generated in a steering shaft and from a current detection value of the motor which gives a steering mechanism a steering assist force. In order to realize ideal road information sensitivity and steering feeling in frequency region at the same time, the electric power steering apparatus comprises a torque filter for processing a torque signal, an SAT estimating function, and an SAT filter for signal-processing SAT information from the SAT estimating function, and the electric power steering apparatus also comprises a control system with two degree of freedom which is capable of independently designing frequency characteristics of steering feeling and road information sensitivity.

4 Claims, 6 Drawing Sheets

U.S. PATENT DOCUMENTS

| | | | | |
|---|---|---|---|---|
| 5,921,344 | A | 7/1999 | Boyer | |
| 5,971,094 | A | 10/1999 | Joshita | |
| 6,112,846 | A * | 9/2000 | Mukai et al. | 180/446 |
| 6,148,948 | A * | 11/2000 | Shimizu et al. | 180/446 |
| 6,412,591 | B1 | 7/2002 | Endo et al. | |
| 6,425,454 | B1 * | 7/2002 | Chabaan et al. | 180/443 |
| 6,445,987 | B1 * | 9/2002 | Kurishige et al. | 701/41 |
| 6,450,287 | B1 * | 9/2002 | Kurishige et al. | 180/446 |
| 6,459,971 | B1 * | 10/2002 | Kurishige et al. | 701/41 |
| 6,490,514 | B2 * | 12/2002 | Kurishige et al. | 701/41 |
| 6,527,079 | B2 * | 3/2003 | Takeuchi et al. | 180/443 |
| 6,570,352 | B2 * | 5/2003 | Hara et al. | 318/432 |
| 6,651,771 | B2 * | 11/2003 | Chabaan | 180/446 |
| 6,671,597 | B2 * | 12/2003 | Kada | 701/41 |
| 6,678,596 | B2 * | 1/2004 | Husain et al. | 701/41 |
| 6,681,165 | B2 * | 1/2004 | Shibasaki et al. | 701/41 |
| 6,751,538 | B2 * | 6/2004 | Endo | 701/41 |
| 6,751,539 | B2 * | 6/2004 | Uenuma et al. | 701/41 |
| 6,763,908 | B2 * | 7/2004 | Ogawa et al. | 180/446 |
| 6,768,283 | B2 * | 7/2004 | Tanaka et al. | 318/632 |
| 6,782,968 | B2 * | 8/2004 | Sakugawa | 180/446 |
| 6,802,226 | B2 * | 10/2004 | Ono et al. | 73/862.325 |
| 6,854,559 | B2 * | 2/2005 | Kurishige et al. | 180/446 |
| 6,859,704 | B2 * | 2/2005 | Aoki et al. | 701/41 |
| 6,863,150 | B1 * | 3/2005 | Tanaka et al. | 180/446 |
| 6,865,461 | B2 * | 3/2005 | Neef et al. | 701/41 |
| 6,938,725 | B2 * | 9/2005 | Fujioka et al. | 180/446 |
| 6,941,213 | B2 * | 9/2005 | Yasui et al. | 701/80 |
| 6,942,057 | B2 * | 9/2005 | Boloorchi et al. | 180/446 |
| 6,983,818 | B2 * | 1/2006 | Fujioka et al. | 180/446 |
| 2002/0056587 | A1 * | 5/2002 | Shibasaki et al. | 180/443 |
| 2003/0055545 | A1 * | 3/2003 | Uenuma et al. | 701/41 |
| 2004/0245041 | A1 | 12/2004 | Fukuda et al. | |
| 2005/0149241 | A1 * | 7/2005 | Fujioka et al. | 701/41 |

FOREIGN PATENT DOCUMENTS

| | | | |
|---|---|---|---|
| DE | 101 19 967 | A1 | 2/2002 |
| EP | 0 716 948 | A2 | 6/1996 |
| EP | 0 718 174 | A2 | 6/1996 |
| EP | 1 127 775 | A1 | 8/2001 |
| EP | 1127775 | A1 * | 8/2001 |
| EP | 1 172 278 | A2 | 1/2002 |
| FR | 2 577 878 | A1 | 8/1986 |
| GB | 2 198 098 | A | 6/1988 |
| JP | 56-11136 | | 1/1981 |
| JP | 62-118783 | | 7/1987 |
| JP | 62-127868 | | 8/1987 |
| JP | 1-145670 | | 10/1989 |
| JP | 6-144246 | | 5/1994 |
| JP | 6-144280 | | 5/1994 |
| JP | 6-23247 | | 8/1994 |
| JP | 8-207797 | | 8/1996 |
| JP | 9-132153 | | 5/1997 |
| JP | 10-16809 | A | 1/1998 |
| JP | 10-129509 | | 5/1998 |
| JP | 10-281235 | | 10/1998 |
| JP | 2000-159128 | | 6/2000 |
| JP | 2000-161435 | | 6/2000 |
| JP | 2001-97232 | | 4/2001 |
| JP | 2001-334948 | A | 12/2001 |
| JP | 2002-96752 | A | 4/2002 |
| JP | 2002-369565 | A | 12/2002 |
| JP | 2003-200844 | A | 7/2003 |
| WO | WO 2004/026665 | A1 | 4/2004 |

* cited by examiner

CONTROL DEVICE FOR MOTORIZED POWER STEERING DEVICE

TECHNICAL FIELD

The present invention relates to an electric power steering apparatus in which a steering assist force caused by a motor is given to a steering system of a car or a vehicle, and more particularly, to an electric power steering apparatus comprising a control system with two degree of freedom which is capable of independently designing steering feeling and road information sensitivity to realize ideal steering feeling and road information sensitivity at the same time in a frequency region.

BACKGROUND TECHNIQUE

The electric power steering apparatus for assist-load energizing the steering apparatus of a car or a vehicle with rotation force of a motor is designed to assist-load energize a steering shaft or a rack shaft with a driving force of the motor by a transmission mechanism such as a gear or a belt through a speed reducer. In such a conventional electric power steering apparatus, feedback control of motor current is performed to precisely generate assist torque (steering assist torque). The feedback control is for adjusting voltage to be applied to the motor such as to reduce a difference between a current command value and a motor current detection value, and the voltage to be applied to the motor is generally conducted by adjusting a duty ratio of a PWM (pulse width modulation) control.

A general structure of the electric power steering apparatus will be explained with reference to FIG. 7. A column shaft 2 of a steering wheel 1 is connected to a tie rod 6 of a running wheel through a speed reducing gear 3, universal joints 4*a* and 4*b* and a pinion rack mechanism 5. The column shaft 2 is provided with a torque sensor 10 for detecting the steering torque of the steering wheel 1. A motor 20 for assisting the steering torque of the steering wheel 1 is connected to the column shaft 2 through the speed reducing gear 3. Electricity is supplied to a control unit 30 which controls the power steering apparatus from the battery 14 through an ignition key 11 and a relay 13. The control unit 30 calculates a steering assist command value I of assist command based on the steering torque T detected by the torque sensor 10 and based on vehicle speed V detected by the vehicle speed sensor 12, and the control unit 30 controls current to be supplied to the motor 20 based on the calculated steering assist command value I.

The control unit 30 mainly comprises a CPU (including MPU also), and general functions of the control unit 30 executed by program in the CPU are shown in FIG. 8. For example, a phase compensator 31 is not a phase compensator as independent hardware, but is a phase compensating function executed by the CPU.

The functions and operation of the control unit 30 will be explained. The steering torque T which is detected and inputted by the torque sensor 10 is compensated in phase by the phase compensator 31 for enhancing the safety of the steering system. The steering torque TA which was compensated in phase is input to a steering assist command value calculating element 32. The vehicle speed V detected by the vehicle speed sensor 12 is also input to the steering assist command value calculating element 32. The steering assist command value calculating element 32 determines the steering assist command value I which is a control target value of current to be supplied to the motor 20 based on the input steering torque TA and vehicle speed V. The steering assist command value I is input to a subtracter 30A and is also input to a differentiation compensator 34 of a feedforward system for enhancing the response speed. A deviation (I-i) of the subtracter 30A is input to a proportion calculating element 35 and is also input to an integration calculating element 36 for improving the characteristics of the feedback system. The output of the differentiation compensator 34 and outputs of the proportion calculating element 35 and the integration calculating element 36 are added and input to an adder 30B. A current control value E which is a result of addition in the adder 30B is input to a motor drive circuit 37 as a motor driving signal. The current i of the motor 20 is detected by a motor current detection circuit 38 and is fed back to the subtracter 30A.

In such a conventional electric power steering apparatus, in order to make full use of the flexibility in design thereof and to obtain stable and comfortable steering feeling, it is proposed to design the transmitting characteristics of the steering feeling and the road information sensitivity in the frequency region (e.g., Japanese Patent Application Laid-open No. 2001-334948). That is, the complementary sensitivity function with respect to frequency of the control apparatus is set a value approaching "1" in a band where there exists disturbance to be suppressed, and is set to a value approaching zero in a band where there exists disturbance to be transmitted. This is because that under the definition of the complementary sensitivity function, when the function is "1", this means that the disturbance is suppressed, and when the function is zero, this means that the disturbance is not suppressed at all and is transmitted.

It is conceived that the steering feeling and the road information sensitivity can be used as indices of performance evaluation in the electric power steering apparatus. However, the conventional electric power steering apparatus has a problem that since the transmitting characteristics representing these two indices have mutual subordinative relation, it is difficult to design a control system which satisfies the two indices at the same time. That is, since the steering feeling and the road information sensitivity have the mutual subordinative relation, the steering feeling and the road information sensitivity can not be designed independently, and it is difficult to design a control apparatus which satisfies the ideal steering feeling and road information sensitivity at the same time.

The present invention has been accomplished in view of the above circumferences, and it is an object of the invention to provide an electric power steering apparatus comprising a control system with two degree of freedom which is capable of independently designing the steering feeling and road information sensitivity for realizing ideal steering feeling and road information sensitivity at the same time in a frequency region.

DISCLOSURE OF THE INVENTION

The present invention relates to an electric power steering apparatus for controlling a motor based on a current command value calculated from a steering assist command value calculated based on a steering torque generated in a steering shaft and from a current detection value of the motor which gives a steering mechanism a steering assist force. The above object of the invention is achieved by the following structure. That is, the electric power steering apparatus comprises a torque filter for processing a torque signal, an SAT estimating function, and an SAT filter for signal-processing SAT information from the SAT estimating function, and wherein the electric power steering apparatus also comprises a control system with two degree of freedom which is capable of independently designing steering frequency characteristics of steering feeling and road information sensitivity.

Further, the above object of the invention is more effectively achieved by the following structure. That is, gain of the steering feeling is set such that the gain maintains at a constant value up to frequency as high as possible, or the road information sensitivity can eliminate information in an unnecessary frequency band, or the unnecessary frequency band is set in a range of 10 Hz to 30 Hz.

BEST MODE FOR CARRYING OUT THE INVENTION

An electric power steering apparatus of the present invention controls a motor based on a current command value calculated from a steering assist command value calculated on the basis of a steering torque generated in a steering shaft and from a current detection value of the motor which gives steering assist force to a steering mechanism. The electric power steering apparatus comprises a torque filter for processing a torque signal from the torque sensor, an SAT estimating function which estimates a self aligning torque (SAT) based on a torque signal, a motor angular speed and the like, and a SAT filter for processing a signal of SAT information estimated by the SAT estimating function. The electric power steering apparatus has a control system with two degree of freedom which is capable of independently designing steering feeling (transmission characteristics from the steering angle of a steering wheel to the steering torque), and road information sensitivity (transmitting characteristics from road surface reaction to steering torque). Thus, the invention has a merit that the control system capable of satisfying the ideal steering feeling and road information sensitivity characteristics at the same time can easily be designed.

The road information sensitivity may be adjusted by changing the suspension characteristics of a car.

An embodiment of the present invention will be explained in detail with reference to the drawings. The invention can be applied to all electric power steering apparatuses irrespective of electric power steering types (column type, pinion type, rack type and the like) and irrespective of kinds of motor (having brush or brushless).

The present invention provides the control system with two degree of freedom which is capable of independently adjusting and designing frequency characteristics of the steering feeling and road information sensitivity, and the control system with two degree of freedom comprises the torque filter with respect to the torque signal, the SAT estimating function for estimating and outputting the SAT, and the SAT filter capable of signal-processing the SAT estimated value estimated by the SAT estimating function in a frequency region. As a result, it is possible to easily design a control system capable of satisfying ideal steering feeling and road information sensitivity characteristics at the same time.

Figure 1:
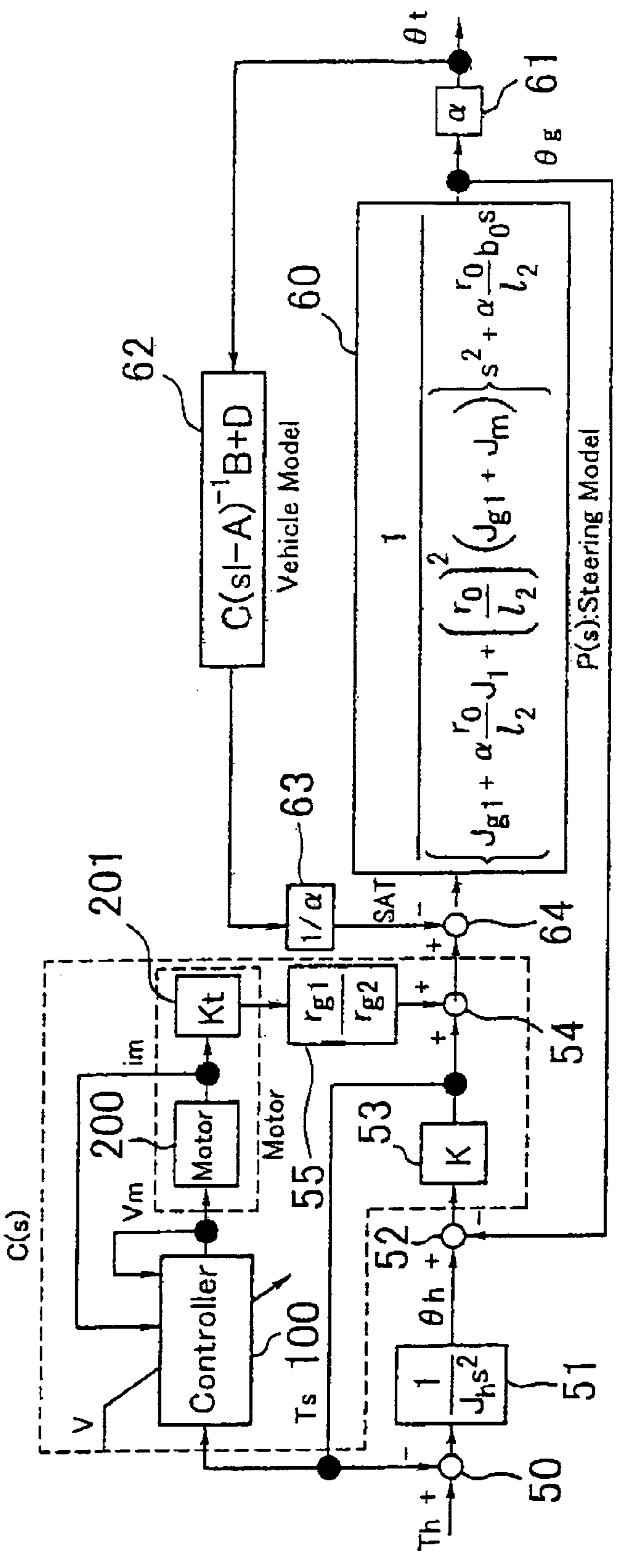
FIG. 1 is a block diagram showing a structure example of an embodiment of the present invention.

FIG. 1 is a block diagram of the entire structure of the electric power steering apparatus of the invention. A steering torque Th from the steering wheel is transmitted to a running wheel (transmitting function: $1/J_h s^2$) 51 through a subtracter 50, and is input to a controller C(s) through another subtracter 52. A block 53 in the controller C(s) represents rigidity (transmitting function: K) of a torsion bar. Output of the controller C(s) is input to a steering model (transmitting function: P(s)) 60 through a subtracter 64, output $\theta_g$ of the steering model 60 is fed back to the subtracter 52, and is output through an overall steering gear ratio (transmitting function: $\alpha$) 61, and is input to the subtracter 64 as SAT information through a vehicle model (transmitting function: $C(sI-A)^{-1}B+D$) 62 and a feedback block (transmitting function: $1/\alpha$) 63. The transmitting functions of the steering model 60 and the vehicle model 62 are known.

Figure 2:
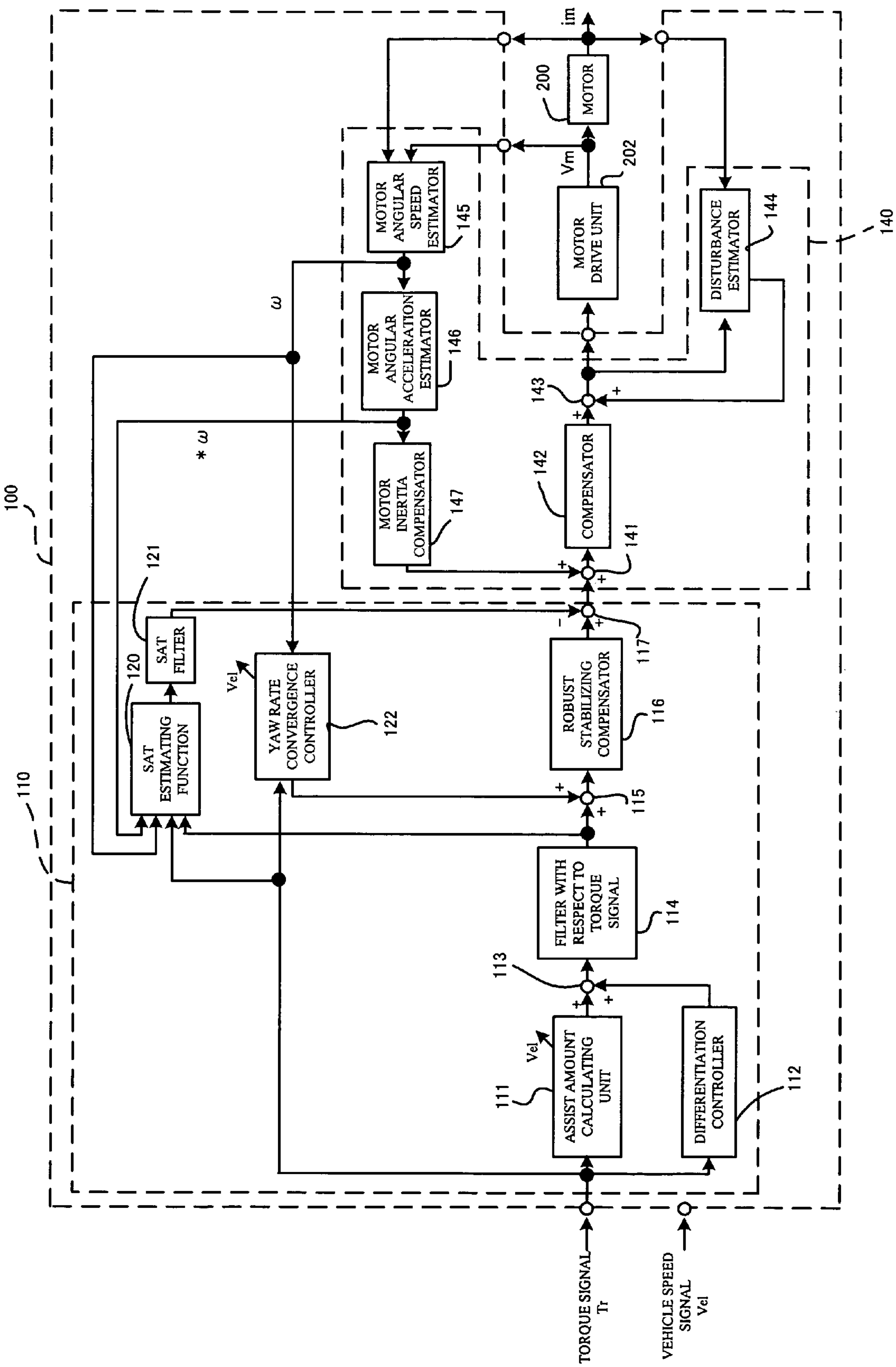
FIG. 2 is a block diagram showing a structure example of a control unit.

The controller C(s) comprises a control unit 100, a speed reduction gear ratio (transmitting function: $r_{g1}/r_{g2}$) 55, a torsion bar (transmitting function: K) 53 and an adder 54. The controller C(s) drives and controls a steering assist motor 200. A motor current im of the motor 200 is input to the control unit 100, and is input to an adder 54 through a torque constant (transmitting function: $K_t$) 201 of the motor and the speed reduction gear ratio 55. FIG. 2 is a detailed block diagram of the control unit 100. The control unit 100 comprises a torque controller 110 and a motor drive system 140, and drives and controls the motor 200 through a motor drive unit 202.

A torque signal Tr is input to an assist amount calculating unit 111, a differentiation controller 112, a yaw rate convergence controller 122 and an SAT estimating function 120. A vehicle speed signal Ve1 is input to the assist amount calculating unit 111 and the yaw rate convergence controller 122. The output of the assist amount calculating unit 111 is output to the differentiation controller 112 and is input to the adder 113, a result of the addition is input to the torque filter 114 and is signal-processed, and the signal-processed filter output is input to the SAT estimating function 120 and is input to a robust stabilizing compensator 116 through an adder 115. The output of the yaw rate convergence controller 122 is input to the adder 115. The SAT information from the SAT estimating function 120 is signal-processed in an SAT filter 121, and is input to the subtracter 117 together with output of the robust stabilizing compensator 116 and is subjected to subtraction processing.

The output of the robust stabilizing compensator 116 is input to an adder 141 in the motor drive system 140 through the subtracter 117, and its addition result is input to the adder 143 through a compensator 142, its addition result is input to the motor drive unit 202 and is input to a disturbance estimator 144. The motor 200 is driven by output (terminal voltage) Vm of the motor drive unit 202, the output Vm and the motor output current im are input to a motor angular speed estimator 145, and the motor output current im is also input to a disturbance estimator 144. A motor angular speed $\omega$ estimated by the motor angular speed estimator 145 is input to the motor angular acceleration estimator 146, the yaw rate convergence controller 122 and the SAT estimating function 120. A motor angular acceleration *ω from the motor angular acceleration estimator 146 is input to a motor inertia compensator 147 and to the SAT estimating function 120.

In such a structure, the assist amount calculating unit 111 calculates the assist amount in accordance with a predetermined calculation equation based on the torque signal Tr and the vehicle speed signal Ve1, the differentiation controller 112 enhances the control response in the vicinity of a neutral point of the steering operation, and realizes smooth steering operation. The robust stabilizing compensator 116 is a compensator disclosed in Japanese Patent Application Laid-open No. H8-290778 for example. The robust stabilizing compensator 116 has a characteristic equation $G(s)=(s^2+a1\cdot s+a2)/(s^2+b1\cdot s+b2)$ wherein s is Laplace operator. The robust stabilizing compensator 116 eliminates a peak value of resonance frequency of a resonance system comprising inertia element and spring element included in the torque signal Tr, and compensates a deviation in phase of the resonance frequency which hinders stability and response of the control system. The yaw rate convergence controller 122 applies the brakes to shaky motion of a steering wheel to improve the convergence of the yaw of a vehicle. The motor inertia compensator 147 multiplies the motor angular acceleration *ω by gain (several steps) to obtain a motor inertial compensation value. The disturbance estimator 144 is an apparatus as disclosed in Japanese Patent Application Laid-open No. H8-310417 for example. The disturbance estimator 144 can maintain a desired motor control characteristics in an output reference of the control system based on the motor output current im and a signal which is obtained by adding output of the disturbance estimator 144 to a current command value compensated by the compensator 142 which is a control target of the motor output. The disturbance estimator 144 prevents the stability of the control system from being lost. The angular speed is estimated in the motor angular speed estimator 145 using a known method based on the motor terminal voltage Vm and the motor output current im.

Here, the SAT estimating function 120 will be explained. Japanese Patent Application No. 2001-171844 filed by the present assignee discloses function. This function can be applied to the SAT estimating function 120. The outline of this application will be explained.

Figure 4:
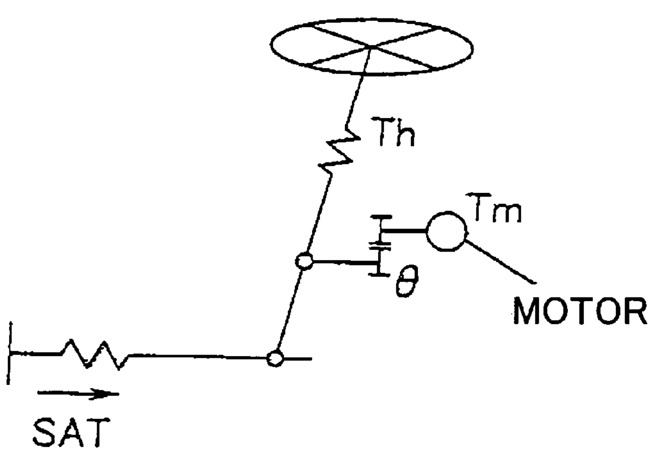
FIG. 4 is a diagram used for explaining estimation of SAT.

FIG. 4 shows torque generated from a road surface to the steering. If a driver steers the steering wheel, a steering torque Th is generated, and motor generates assist torque Tm in accordance with the steering torque Th. As a result, running wheels are steered, and SAT is generated as reaction force. At that time, inertia J of the motor and friction (static friction) Fr generate resistance against the steering operation. If the balance of these forces is conceived, the following kinetic equation (1) is obtained:

$$J\cdot{*\omega}+Fr\cdot\mathrm{sign}(\omega)+SAT=Tm+Th \tag{1}$$

Here, the equation (1) is Laplace converted while using zero as an initial value, and if SAT is solved, the following equation (2) is obtained:

$$SAT(s)=Tm(s)+Th(s)-J\cdot{*\omega}(s)+Fr\cdot\mathrm{sign}(\omega(s)) \tag{2}$$

As is found from the equation (2), if the inertia J of the motor and the static friction Fr are previously obtained as constants, SAT can be estimated from the motor angular speed ω, the motor angular acceleration *ω, the steering assist force and the steering signal. From this reason, outputs of the torque signal Tr, the motor angular speed ω, the motor angular acceleration *ω and torque filter 114 of the assist amount calculating unit 111 are input to the SAT estimating function 120.

If the SAT information estimated by the SAT estimating function 120 is fed back as it is, the steering force becomes excessively large, and the steering feeling can not be enhanced. Thus, the estimated SAT information is signal-processed using the SAT filter 121, and only information that is necessary for enhancing the steering feeling is output.

Figure 3:
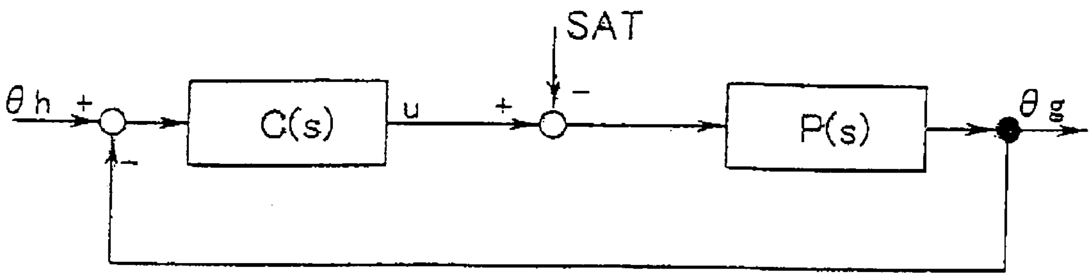
FIG. 3 is a schematic diagram of FIG. 2.

Next, the structure of the control system with two degree of freedom will be explained. The control unit 100 shown in the block diagram of FIG. 1 has the structure as shown in FIG. 2. The control unit 100 comprises the torque filter 114 for processing the torque signal Tr, the SAT estimating function 120 for estimating the SAT, and the SAT filter 121 for signal-processing the SAT information from the SAT estimating function 120. In the block diagram of FIG. 1, the rigidity K of the torsion bar 53 and the controller of the electric power steering are combined as a new controller C(s), and the steering system is defined as P(s), and a general control system is as shown in FIG. 3. In FIG. 3, if the operation amount u which is output from the controller C(s) is conceived, a relation of the following equation (3) is obtained:

$$u=Ts+Tm-Q\cdot\hat{SAT} \tag{3}$$

In the equation (3), Ts represents steering torque (detection value), Tm represents assist torque, Q represents the SAT filter 121 capable of processing the SAT estimated value in the frequency region, and hat SAT represents an estimated value estimated by the SAT estimating function. Here, if a controller except the SAT estimating function 120 and the SAT filter 121 is defined as C' (s) and the estimated SAT and the actual SAT are equal to each other (SAT=hat SAT), the following transmitting function equation is obtained. A torque filter 114 with respect to the torque signal Tr is also included in the controller C' (s).

$$\theta_g=\frac{PC}{1+PC'}\theta_h-\frac{(1+Q)P}{1+PC'}T_{sat} \tag{4}$$

The steering feeling (transmitting characteristics from the steering angle $\theta_h$ of the steering wheel to steering torque Ts) Gsf and road information sensitivity (transmitting characteristics from the road reaction force SAT to the steering torque Ts) Gds are conceived as evaluation function in the control apparatus of the electric power steering apparatus. Therefore, if $Ts=K(\theta_h-\theta_g)$ indicative of the detection characteristics of torque is substituted into the equation (3), the following equation (5) is obtained:

$$T_s=\frac{K}{1+PC'\theta_h}-\frac{K(1+Q)P}{1+PC'}T_{sat} \tag{5}$$

Here, the road information sensitivity Gds and the steering feeling Gsf can be expressed as the following equations (6) and (7):

$$Gds=\{K(1+Q)P\}/(1+PC') \tag{6}$$

$$Gsf=K/(1+PC') \tag{7}$$

From the equations (6) and (7), it can be found that there exists a relation of the following equation (8) between the road information sensitivity Gds and the steering feeling Gsf:

$$Gds=Gsf\cdot P(1+Q) \tag{8}$$

Here, K represents the rigidity of the torsion bar, and P represents a subject to be controlled. Therefore, the control system is designed such that the controller C' and the SAT filter Q are adjusted so that the road information sensitivity Gds and the steering feeling Gsf have preferable characteristics. To design the control system, the controller C' is first adjusted so that the steering feeling Gsf has preferable characteristics and then, the SAT filter Q is adjusted so that the road information sensitivity Gds has the preferable characteristics. However, when the system does not have the SAT estimating function 120 and the SAT filter 121 (Q=0), since the control system with two degree of freedom can not be constituted, it is necessary to provide the road information sensitivity Gds and the steering feeling Gsf with the preferable transmitting function by adjusting the controller C' only. For this reason, it is difficult to design a control system which satisfies the road information sensitivity Gds and the steering feeling Gsf at the same time.

Thus, as in the present invention, the controller C' (s) including the torque filter 114 with respect to the torque signal Tr is first tuned so that the transmitting characteristics of the steering feeling Gsf has the preferable characteristics and then, the SAT filter 121 (Q) is tuned so that the transmitting characteristics of the road information sensitivity Gds has the preferable characteristics. With this, it becomes easy to design a control system which satisfies the two evaluation functions at the same time. That is, the control system with two degree of freedom can be constituted.

Figure 5:
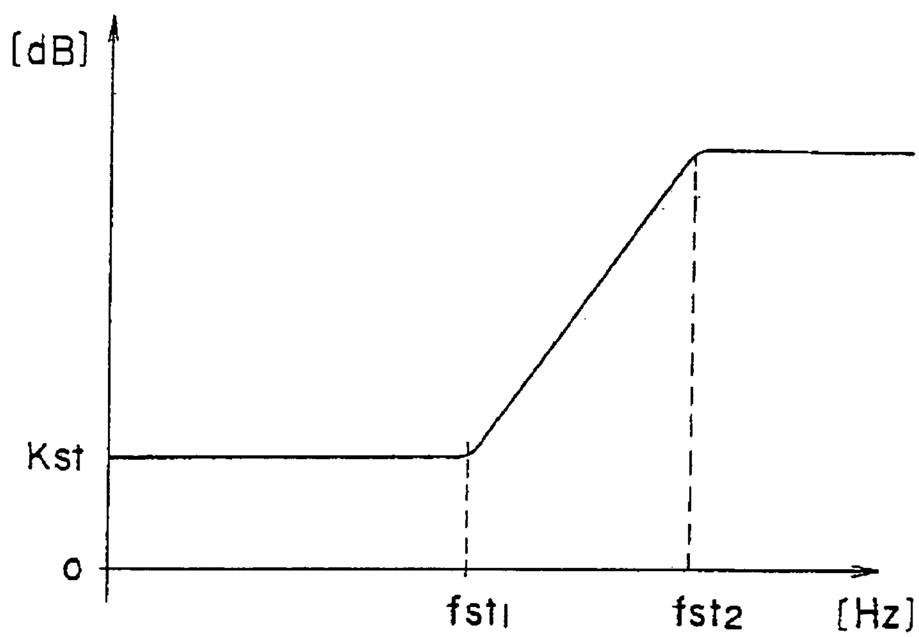
FIG. 5 is a diagram showing target transmission characteristics of steering feeling.

FIG. 5 shows target transmitting characteristics of the steering feeling. Here, a gain Ksf increases or reduces the weight of the steering operation. If the gain Ksf is greater, the steering operation becomes heavier, and if the gain Ksf is smaller, the steering operation becomes lighter. The characteristics are determined by a driver's tastes. In view of steering following ability, it is preferable to design such that the gain becomes constant up to frequency as high as possible (fst1 is above 5 Hz and fst2 is depends on characteristics of vehicle and motor).

Figure 6:
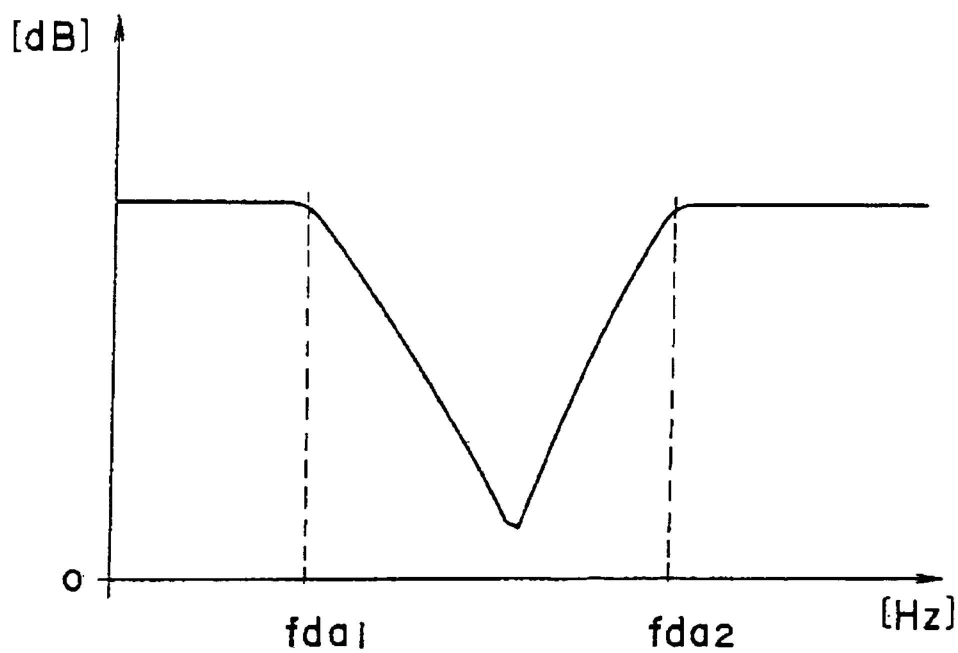
FIG. 6 is a diagram showing target transmission characteristics of road sensitivity information.
Figure 7:
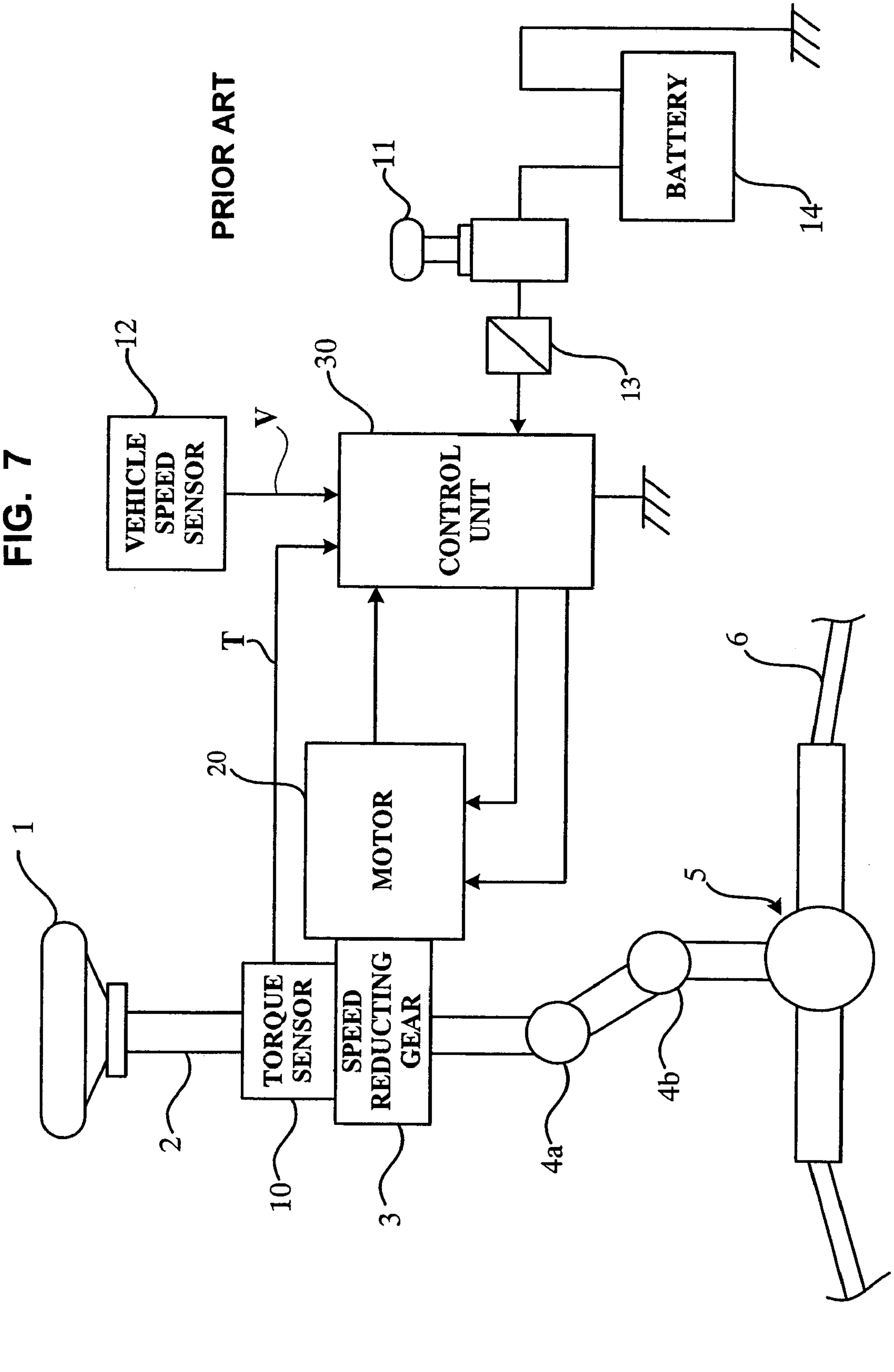
FIG. 7 is a diagram showing a structure example of a general power steering apparatus.
Figure 8:
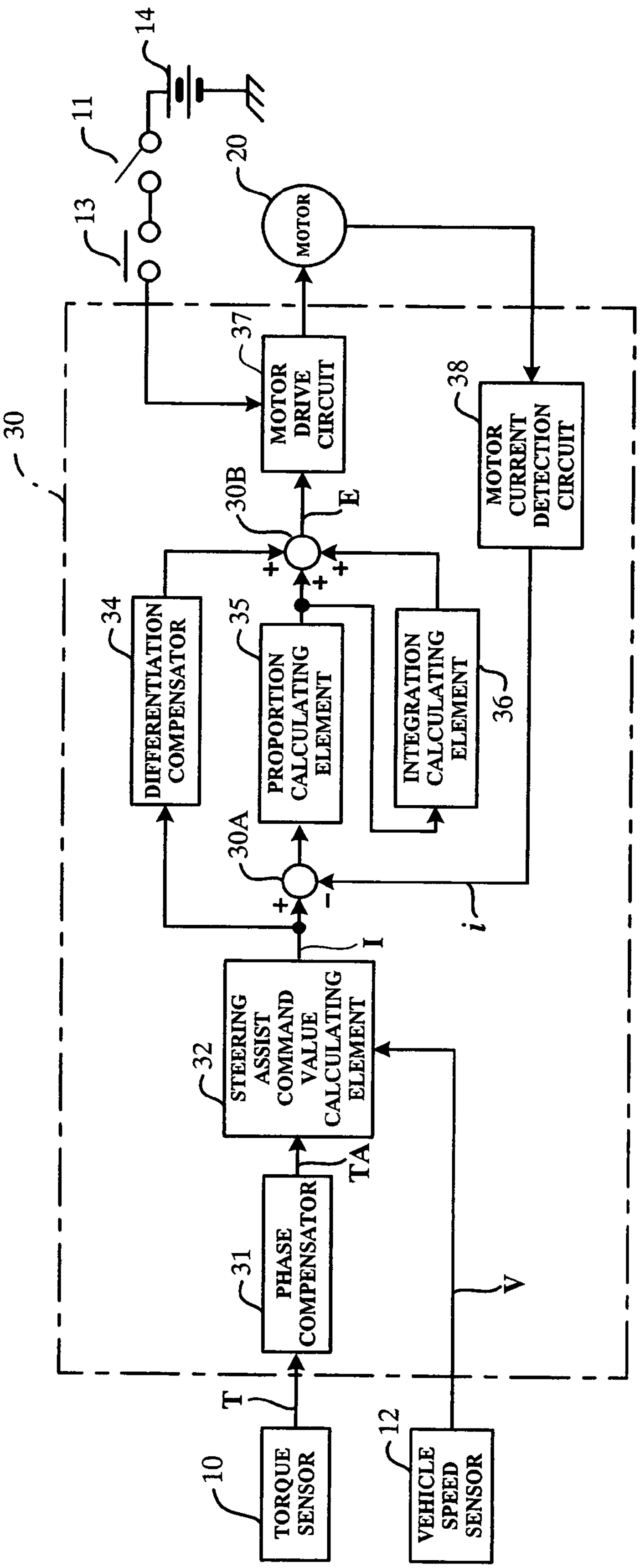
FIG. 8 is a block diagram showing a structure example of a control unit.

FIG. 6 shows the target transmitting characteristics of road sensitivity information. The road information is one of important information for a driver. However, since a driver knows that unnecessary road information exists between 10 Hz and 30 Hz based on his or her experience, preferable characteristics are such frequency characteristics that road information in the frequency region is not transmitted to the steering operation. Therefore, the control system is designed such that the lower limit frequency fda1 is about 10 Hz, and the upper limit frequency fda2 is about 30 Hz.

The roles of the torque filter 114 and the SAT filter 121 are conceived as adjusting parameters for designing the control system, and it is conceived that the characteristics required for the torque filter 114 and the SAT filter 121 are varied depending upon vehicle's characteristics and other controller's characteristics. Therefore, the target following ability characteristics shown in FIG. 5 and characteristics required for realizing the road surface sensitivity characteristics shown in FIG. 6 are the characteristics required for the torque filter 114 and the SAT filter 121. That is, the torque filter 114 with respect to the torque signal Tris used for improving the following ability characteristics of the electric power steering apparatus, and if the characteristics of the torque filter 114 with respect to the torque signal Tr included in C' in the equation (5) is adjusted, the following ability characteristics shown in FIG. 5 are realized. The SAT filter 121 is used for adjusting the road information sensitivity characteristics, and if the characteristics of the SAT filter 121 is adjusted, the road surface sensitivity characteristics are realized.

INDUSTRIAL APPLICABILITY

According to the present invention, the control system with two degree of freedom comprises a torque filter for processing a torque signal, an SAT estimating function, and an SAT filter capable of processing the estimated SAT information in a frequency region. Thus, the steering feeling and the road information sensitivity can independently be designed. As a result, it is possible to easily design a control system capable of satisfying the ideal road information sensitivity and steering feeling at the same time.

What is claimed is:

1. An electric power steering apparatus for controlling a motor based on a current command value calculated from a steering assist command value calculated based on a steering torque generated in a steering shaft and from a current detection value of the motor which gives a steering mechanism a steering assist force, comprising:

a torque filter for processing a torque signal from a torque sensor that detects the steering torque of the steering wheel;

an SAT estimating function for estimating a road surface reaction, i.e., self-align torque (SAT) based on a balance of forces generated from a road surface to said steering shaft; and an SAT filter for signal-processing SAT information from said SAT estimating function, wherein:

said electric power steering apparatus also comprises a control system with two degrees of freedom which independently tunes frequency characteristics of steering feeling and road information sensitivity.

2. An electric power steering apparatus according to claim 1, wherein gain of said steering feeling is set such that the gain maintains at a constant value up to frequency as high as possible.

3. An electric power steering apparatus according to claim 1, wherein said road information sensitivity can eliminate information in an unnecessary frequency band.

4. An electric power steering apparatus according to claim 3, wherein said unnecessary frequency band is in a range of 10 Hz to 30 Hz.

* * * * *